United States Patent [19]

Hurlbut, Sr. et al.

[11] 3,765,980
[45] Oct. 16, 1973

[54] METHOD FOR FORMING PIPE WITH INTEGRAL HOLE OR NOZZLE PATTERN

[75] Inventors: William B. Hurlbut, Sr., East Hartford; Preston D. Liebig, West Hartford, both of Conn.

[73] Assignee: Combination Engineering, Inc., Windsor, Conn.

[22] Filed: Sept. 24, 1971

[21] Appl. No.: 183,497

[52] U.S. Cl.............. 156/175, 156/173, 156/289, 156/446
[51] Int. Cl........................ B65h 81/08, B32b 5/02
[58] Field of Search.................. 156/173, 175, 289, 156/425, 446; 242/7.21, 7.22

[56] References Cited
UNITED STATES PATENTS

| | | | |
|---|---|---|---|
| 3,231,442 | 1/1966 | Michael | 156/289 |
| 3,629,028 | 12/1971 | McLarty et al. | 156/289 |
| 3,189,500 | 6/1965 | Escher | 156/173 |

FOREIGN PATENTS OR APPLICATIONS

| | | | |
|---|---|---|---|
| 686,209 | 5/1964 | Canada | 156/173 |

*Primary Examiner*—Daniel J. Fritsch
*Attorney*—Eldon H. Luther et al.

[57] ABSTRACT

A method for forming pipe from reinforced fiberglass, the pipe having an integral hole or nozzle pattern. A mandrel with removable pins of a specific diameter and configuration placed in a desired array therealong is used as a pattern for resin impregnated reinforced fiberglass which is filament wound on the mandrel to build up the pipe structure.

2 Claims, 6 Drawing Figures

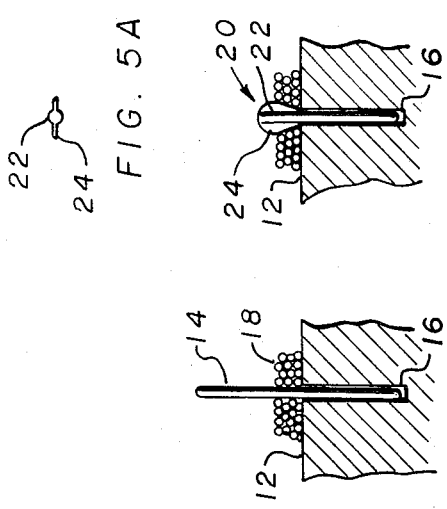
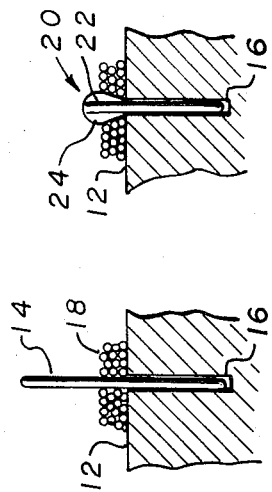
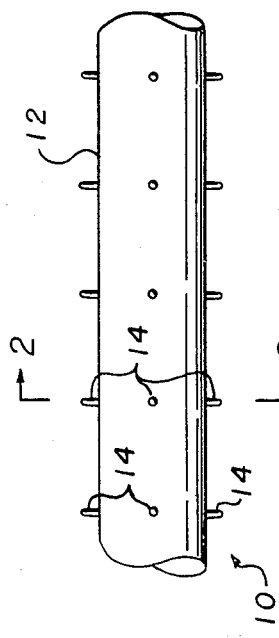
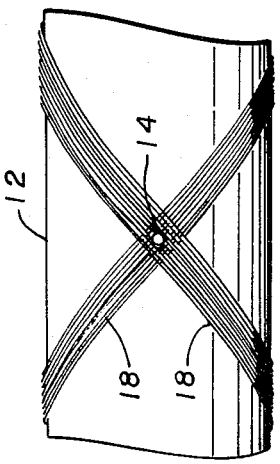
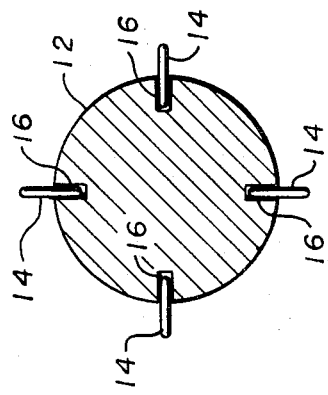

METHOD FOR FORMING PIPE WITH INTEGRAL HOLE OR NOZZLE PATTERN

BACKGROUND OF THE INVENTION

With air pollution being a prominent problem facing man today a system has been developed to substantially reduce both the particulate matter and the toxic gases contained in the flue gases resulting from the fossil fuel combustion process. This system involves the feeding of an alkaline earth additive to the furnace and wet scrubbing the evolved flue gases. The pulverized additive fed to the furnace is calcined producing a more reactive compound. The calcined particles react with the combustion gases to form compounds of calcium and magnesium (removing a large percent of sulfur oxides from the gas) which are scrubbed from the flue gas in a wet scrubber arrangement. The portion of the flue gas containing the unreacted sulfates and calcined additive also passes into the wet scrubber arrangement wherein the calcined additive that is not combined with the sulfate in the furnace reacts with the water and the remaining sulfate to form sulfates and sulfites of calcium and magnesium which are therein scrubbed from the gas. Additionally, the water serves to entrain the fly ash, resulting in particulate matter removal due to the washing action within the scrubber. The cleansed flue gases then pass through a demister for removal of any remaining water trapped in the gas.

The demister assembly within the wet scrubber arrangement typically is comprised of a series of plates which divert the flue gases flowing therethrough so as to impart forces to the heavier water droplets in the gas for removing the water from the gas stream. With this arrangement, however, there is a tendency to have a buildup of corrosive products on the demister plates with eventual plugging of the scrubber system. It is, therefore, necessary to provide some means for keeping the demister plates clean.

A recent development for keeping demister assembly plates free of corrosive products involves the use of a washing lance. This novel lance assembly is described in copending application Ser. No. 182,968 filed Sept. 23, 1971. The lance is formed of rigid fiber reinforced plastic and segmented into interengagable modular increments.

SUMMARY OF THE INVENTION

There is herein provided a novel method for forming pipe of reinforced fiberglass having an integral hole or nozzle arrangement for use as an example a demister assembly washing lance. The method for forming the pipe includes the use of a mandrel having removable pins of specific diameter and configuration placed in a desired array therealong, the mandrel and pins serving as a pattern for resin impregnated reinforced fiberglass which is filament wound on the mandrel to build up the pipe structure.

BRIEF DESCRIPTION OF THE DRAWINGS

FIG. 1 is a side view of the pipe-forming mandrel with the removable pins inserted therein.

FIG. 2 is a cross sectional view of the mandrel taken on line 2—2 of FIG. 1.

FIG. 3 is a side view of the mandrel showing the buildup of filament wound fiberglass around a pin member.

FIG. 4 is an enlarged side view of a pin inserted in the mandrel.

FIGS. 5 and 5A are an enlarged view of a spray nozzle forming pin placed in the mandrel.

DESCRIPTION OF THE PREFERRED EMBODIMENT

Referring now to the drawings, FIGS. 1 and 2 show a mandrel arrangement 10 upon which the reinforced plastic pipe will be formed according to this novel method. The mandrel arrangement 10 has a cylindrical body 12 with recesses 16 equally spaced about the surface thereof. Pins 14 are inserted into the recesses 16 in a preselected array such that when the pipe being built up thereon is formed it will have holes at desired locations. FIGS. 3 and 4 show in more detail a standard pin 14 inserted in the receptacle 16 in the mandrel body 12. The pin 14 has, for example, a friction fit within the receptacle 16 and extends outwardly therefrom a sufficient distance to insure that it may be gripped for removal after the pipe thickness has been built up.

In order to properly build up the desired pipe, a particular array of desired holes is determined to yield optimum characteristics depending on the particular use of the finished pipe. Pins 14 are inserted in the preselected receptacles 16 of the mandrel body 12 to yield a finished pipe with the desired array of holes. The mandrel body 12 and pins 14 are coated with a suitable release coating, such as wax or silicone, to facilitate pipe removal from the mandrel after it is built up. The coated mandrel may then be rotated and the filaments 18 wound with a reciprocatory motion so as to yield a helical path build up on the mandrel body 12 and about the pins 14 (see FIG. 3) until the desired pipe thickness is obtained. The filaments 18 are impregnated with a suitable binding resin so that the windings 18 will harden into a rigid pipe without any additional operational steps. After the pipe is formed, the pins 14 may be readily removed (due to the release coating) and the pipe slipped off the mandrel body 12 for ultimate use.

If the pipe is to be used for example as a modular segment for the demister washing lance of the aforementioned U. S. application Ser. No. 182,968, it would be desired that each hole in the rigid reinforced plastic pipe be of a specific shape to yield a particular washing spray pattern. Therefore, a nozzle pin 20 of the desired specific shape may be inserted in each receptacle 16 in a desired array in the mandrel body 12 in place of the pins 14. The nozzle pin 20 may, for example, have a cylindrical shaft 22 which has a friction fit into the receptacle 16 and a flat flanged portion 24 which provided the desired opening between the filament windings 18. With the nozzle pins 20 so located, the pipe is built up by the coating and winding steps in the manner as set forth immediately above.

From the foregoing it is readily apparent that there is herein provided a novel method for obtaining rigid reinforced fiberglass pipe having an integral hole or nozzle pattern. After determining the particular array of holes desired in the finished pipe and the configuration of each particular hole, pins of specific diameter and configuration may be placed in an appropriate mandrel to serve as the pattern for the pipe to be built up. The mandrel and pins are coated with a suitable release coating and then resin impregnated filaments of reinforced fiberglass are wound with a reciprocatory motion on the mandrel as it is rotated to yield a helical path buildup of the desired pipe.

While this preferred embodiment of the invention has been shown and described, it will be understood that it is merely illustrative and that changes may be made without departing from the scope of the invention as claimed.

What is claimed is:

1. A method for forming pipe from reinforced fiberglass, the pipe having a desired integral hole pattern in the wall thereof, the method comprising the steps of: selecting a series of pins of an external configuration so as to serve as a proper pattern for the holes of said desired integral hole pattern; removably placing said series of pins in a mandrel in an array which conforms to said desired integral hole pattern; coating said mandrel and said pins with a release coating; filament winding resin impregnated reinforced fiberglass on said mandrel about said pins to build up the desired pipe structure; and then removing said pins from said mandrel and sliding said desired pipe structure off of said mandrel.

2. A method for forming rigid reinforced fiberglass pipe having a desired integral hole pattern in the wall thereof comprising the steps of: selecting a mandrel of diameter and length so as to serve as a proper pattern for said pipe; selecting a series of pins of an external configuration so as to serve as a proper pattern for the holes of said desired integral hole pattern; placing said series of pins in said mandrel in an array which conforms to said desired integral hole pattern, said pins being placed so as to be removable therefrom; coating said mandrel and said pins with a suitable release coating; rotating said mandrel; winding filaments of resin impregnated reinforced fiberglass on said mandrel with a reciprocatory motion so as to obtain a helical path buildup on said mandrel about said pins to yield the desired pipe structure; and then removing said pins from said mandrel and sliding said desired pipe structure off of said mandrel.

* * * * *